United States Patent [19]

Holden et al.

[11] Patent Number: 4,698,779
[45] Date of Patent: Oct. 6, 1987

[54] GRAPHIC DISPLAY WITH DETERMINATION OF COINCIDENCE OF SUBJECT AND CLIP AREAS

[75] Inventors: Ian Holden, Winchester; Michael J. Malings, Whitchurch, both of England

[73] Assignee: International Business Machines Corporation, Armonk, N.Y.

[21] Appl. No.: 728,718

[22] Filed: Apr. 30, 1985

[30] Foreign Application Priority Data

May 5, 1984 [GB] United Kingdom ................ 8411579

[51] Int. Cl.⁴ ........................ G06F 15/72; G09G 1/06
[52] U.S. Cl. .................................. 364/520; 340/729; 340/747; 364/522; 382/9
[58] Field of Search ... 364/518, 520, 522, 900 MS File; 340/723, 729, 735, 747; 382/9; 358/287

[56] References Cited

U.S. PATENT DOCUMENTS

| | | | |
|---|---|---|---|
| 3,816,726 | 6/1974 | Sutherland et al. | 340/729 |
| 3,889,107 | 6/1975 | Sutherland | 340/729 |
| 4,156,237 | 5/1979 | Okada et al. | 364/522 |
| 4,319,339 | 3/1982 | Utzerath | 364/900 |
| 4,328,550 | 5/1982 | Weber | 364/900 |
| 4,412,296 | 10/1983 | Taylor | 340/729 |
| 4,492,956 | 1/1985 | Collmeyer et al. | 340/723 |
| 4,531,120 | 7/1985 | Brownell, Jr. et al. | 340/723 |

FOREIGN PATENT DOCUMENTS 2128459A 4/1984 United Kingdom ................ 340/747

OTHER PUBLICATIONS

R. K. DeBry, "Halftone Graphics Using Program Character Set", IBM Technical Disclosure Bulletin, vol. 20, No. 6, Nov. 1977.
M. Patterson et al., "Speed, Precision, and Smoothness Characterize Four-Color Plotter Pen Drive System", Hewlett-Packard Journal, Sep. 1977, pp. 13-19.

Primary Examiner—Errol A. Krass
Assistant Examiner—Kevin J. Teska
Attorney, Agent, or Firm—Frederick D. Poag

[57] ABSTRACT

A method of determining the coincidence of a subject area and a clip area in a graphic display system, comprising creating three parts list, one for parts of the subject area that are outside the clip area, a second for parts of the clip area that are inside the subject area and a third for overlapping lines. The parts of the subject area which lie outside the clip area are defined by examining the parts lists. The output can then be used to control a pen plotter, in which different colors are used so that underlying areas do not have to be linked over with overlay colors.

6 Claims, 11 Drawing Figures

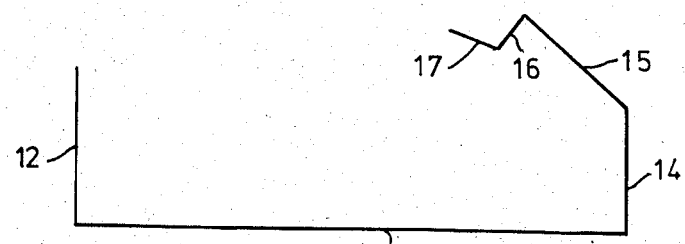
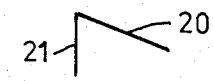
FIG. 2a  FIG. 2b
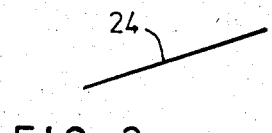
FIG. 3a  FIG. 3b
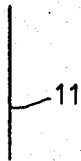
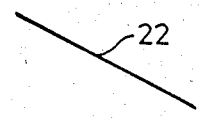
FIG. 4a  FIG. 4b

GRAPHIC DISPLAY WITH DETERMINATION OF COINCIDENCE OF SUBJECT AND CLIP AREAS

This invention relates to graphic display systems and in particular to such systems that include a pen plotter as an output device for pictures developed in the system.

BACKGROUND AND PRIOR ART

An interactive graphic display system such as the chart utility of the IBM Graphics Display Data Manager (GDDM) which is described in EU patent publication No. 26266 gives a user the ability to create graphic pictures on a display screen such as an IBM 3279. (IBM is a Registered Trade Mark). Once created it is often desirable to have a hardcopy of the picture and pen plotters connected to the system are commonly used for this purpose.

Pen plotters provide a cheap, high quality graphics hard copy capability.

However the technology differs from that of a cathode ray tube display in one significant way, once something is drawn, it cannot be erased or changed. This difference presents a problem where, say, a red square is drawn over a larger blue square. On a display, the underlying blue pels are simply changed to red pels, but on a plotter, the red will be drawn over the blue and a muddy brown colour will result. To provide quality output on plotters, it is therefor necessary to alter any underlying areas by clipping out any overlying areas. When the clipped underlying area is drawn and shaded, it will leave blank paper where the overlying areas will subsequently be drawn, resulting in a much more acceptable plot.

Various methods for area clipping have been published. "Reentrant Polygon Clipping", Ivan E. Sutherland & Gary W Hodgman Comm. of ACM January 1974 V17 no. 1 p. 32–42 describe a simple method for clipping a concave polygon to a convex area. This requires a concave clip area to be divided into convex polygons thus increasing the complexity of the calculations. "Hidden surface removal using polygon area sorting" Kevin Weiler & Peter Atherton Siggraph 77 proceedings Computer Graphics 11(2) Summer 77 p. 214 describe another method for clipping concave polygons with holes, but this requires the polygons to be defined in a clockwise direction and holes in an anticlockwise direction.

BRIEF DESCRIPTION OF INVENTION

The method of the present invention places no restrictions on the area definitions. Both the subject and clip areas may consist of multiple, overlapping, self-intersecting polgyons. The inside of an area is defined as all points that would cross the area boundary an odd number of times if moved along a straight line to infinity.

It is an object of the invention to provide a method for a complex area definition to be clipped to another complex area definition.

The method also finds use with regard to quality plotting in:

Implementing 'background' lines by treating each background line as a thin area of width twice that of the pen. These can then be clipped out of any parts of the picture that they overlay.

When plotting on foils, a common problem is ink run, for example where two areas abut and are coloured differently, because the ink takes a long time to dry, the two colours blend into each other along the boundary. This can be solved by shrinking the areas by one pen width. The easiest way to do this for an arbitrary area definition is to define a thin area of twice the pen width that goes around the boundary of the area, and clip this out of the original area.

According to the present invention there is provided a method of determining the coincidence of a subject area and a clip area, in a graphic display system in which area definitions are stored in a display list store comprising the steps of:

(a) creating and storing a subject area parts list comprising separate entries for each part of one or more contiguous lines of the subject area that do not pass through the clip area (b) creating and storing a clip area parts list comprising separate entries for each part of one or more contiguous lines of the clip area that pass through the subject area (c) creating and storing an overlap parts list comprising separate entries for each part of one line of the subject and clip areas that overlap (d) for each entry in the subject area parts list scanning unprocessed entries first in the subject area parts list secondly in the clip area parts list thirdly in the overlap parts list for an entry having an end point definition the same as one end point definition of the part being processed, creating a new part by joining any part found to the part being processed storing the created part in a results part list and reiterating the process for the entry in the results part list until no further parts are found whereby the results part list includes the definition of the portion of the subject area which does not coincide with the clip area.

According to a second aspect of the invention there is provided a graphic display system, in which complex area definitions are stored in a display list buffer, including control means adapted to control the operation of the system to perform the method of determining the coincidence of a subject area and a clip area comprising the steps of:

(a) creating and storing a subject area parts list comprising separate entries for each part of one or more contiguous lines of the subject area that do not pass through the clip area (b) creating and storing a clip area parts list comprising separate entries for each part of one or more contiguous lines of the clip area that pass through the subject area (c) creating and storing an overlap parts list comprising separate entries for each part of one line of the subject and clip areas that overlap (d) for each entry in the subject area parts list scanning unprocessed entries first in the subject area parts list secondly in the clip area parts list thirdly in the overlap parts ist for an entry having an end point definition the same as on end point definition of the part being processed, creating a new part by joining any part found to the part being processed storing the created part in a result part list and reiterating the process for the entry in the results part list until no further parts are found whereby the results part list includes the definition of the portion of the subject area which does not coincide with the clip area.

DESCRIPTION OF THE PREFERRED EMBODIMENT OF THE INVENTION

In order that the invention may be fully understood it will now be described with reference to the accompanying drawings in which:

FIGS. 1–4 illustrate the operation of the method by way of example.

Figure 1A:
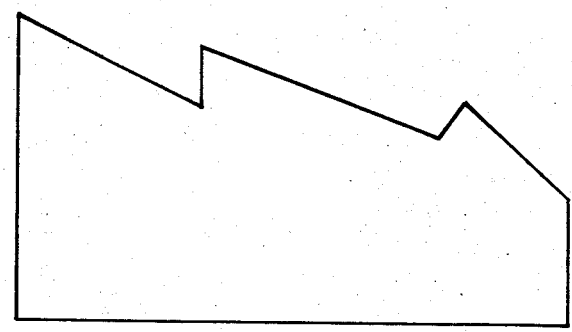
Figure 1B:
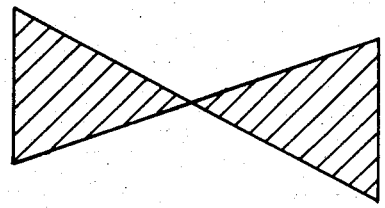
Figure 1C:
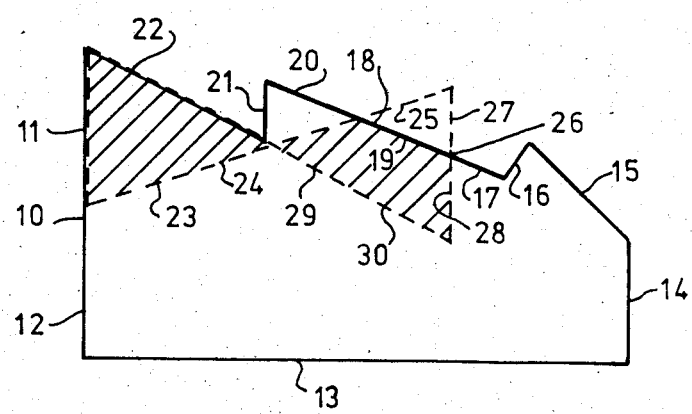

The method embodying the invention will clip a 'subject area' to a 'clip area' producing a result that is an area defining all parts of the subject area that are outside the clip area. If necessary, the method is easily changed to clip the other way around, i.e. to produce a definition of the parts of the subject area that are inside the clip area.

Each area definition is represented by a list of polygon definitions, each polygon definition is represented by a ring of vertices. The resultant area definition is in the same format so that it can be further clipped to other areas if required.

The method involves building three lists. One (the subject parts list) contains the parts of the subject area boundary that are outside the clip area. The second (the clip parts list) contains the parts of the clip area boundary that are inside the subject area, and the third all clip area boundary lines that overlap subject area boundary lines (referred to as: 'overlapping' clip parts).

Each list is built up by considering each line in the area and clipping it to the insie/outside of the other area. This requires a line clipping routine that can clip an arbitrary line to an arbitrary area definition. In particular it must cope with lines that (i)-may intersect the area at a vertex, (ii) may overlap one (or more) of the area boundary lines; and areas that may consist of multiple overlapping, self-intersecting polygons. Such a routine is described below.

The resultant area definition is produced by joining the parts in the three lists together to form polygons.

The joining process proceeds by taking a subject part and attempting to join it, 1st: to a non-overlapping clip part, 2nd: to another subject part, and 3rd: to an overlapping clip part.

Thus the subject part is extended, and the total number of parts is reduced. When a polygon is formed, it is removed from the subject parts list and added to the resultant area definition. This process continues for each subject part until there are none left.

Finally, any remaining clip parts are joined (when possible) in an attempt to form more polygons. These polygons are added to the resultant area definition unless they were formed only from overlapping clip parts. In this case, it is determined whether this polygon (which is common to both subject and clip areas) has the same sense (hole or solid) in both the subject and clip areas. The polygon is only added to the result if its sense is different in the subject and clip areas.

In the rare situation of clipping to a self intersecting area with many boundary lines that are common or overlap the subject boundary, it is possible that after joining various parts, a dead end is reached, i.e. no part can be found that will join. This situation may occur when there are two or more overlapping clip parts that can be joined to the subject part, and the wrong one happens to be chosen. This occurs very infrequently and the simplest solution is to shift the subject area by a tiny amount in the x and y direction, then restart the clipping process.

FIGS. 1 to 4 illustrate the method by way of example. A complex polygon such as shown in 1 (a) is displayed on a display screen. This may be part of a graph for example. A second area shown at 1 (b) is to be overlaid on the area of 1 (a) to give the result shown in FIG. 1 (c). It is then necessary to clip the shaded area of 1 (b) from the area of 1 (a).

FIGS. 2a and 2b illustrate the contents of a subject parts list.

FIGS. 3a and 3b illustrate the contents of a clip parts list.

FIG. 4a and 4b illustrate the contents of an overlap parts list.

Of course all lines and parts are actually stored in the form of end point coordinates and the drawings are used for illustration only.

In general terms the first step is for all lines of the subject area to be examined to determine whether or not they pass through the clip area. Starting at the top left corner line 10 has a portion 11 which overlaps the clip area. This is added to the overlap parts list (FIG. 4a). The second portion 12 is added to the subject parts list FIG. 2.

The lines 13, 14, 15 and 16 are then examined and are added to the subject parts list. As each has a common coordinate with the previous line a complex part is developed. The line 18 has a portion 19 which passes through the clip area and portions 17 and 20 which do not. The portion 17 is added to the complex part 2 (a) in the subject parts list, the portion 19 is ignored and the portion 20 starts a new part in the subject parts list. The line 21 is added to the part 20 in the subject parts list and the line 22 is added to the overlap parts list (4 (b).

The clip area is then examined for lines that pass through or are contained in the subject area. The line 11 is already in the overlap parts list. Line 23 has two parts portion 24 is added to the clip parts list and portion 25 is ignored as is portion 27 of line 26. However portion 28 and portion 29 of line 30 are added to the clip parts list (3 (b)). Portion 22 of line 29 is already in the overlay parts list.

In order to build the subject area minus the clip area, the first entry in the subject parts list is examined and then in the following order remaining entries in the clip parts list and then the overlap parts list are examined to determine the first that has a common end point coordinate with the first entry. This part found is then added to the subject part and the result placed in a result parts list. The process is reiterated using the entry in the results parts list until no parts having a common end point with the resultant part is found. In all cases the result shall be a closed polygon. The next entry in the subject parts list is then examined and the processes repeated until there are no further parts in the subject parts list. The result parts list will then contain a definition of the subject area minus the clip area.

There now follows a detailed description of the method. The method has been divided into small procedures and FIG. 5 shows how they are related.

Figure 5:
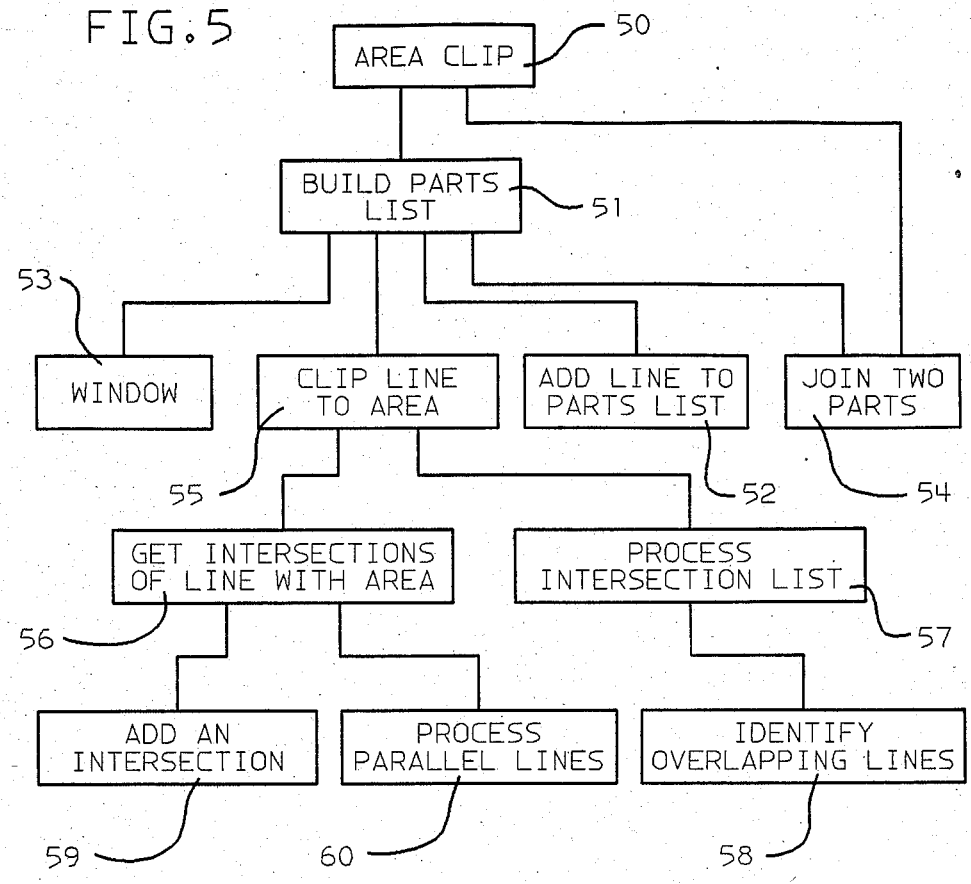
FIG. 5 illustrates the component procedures of the method.

Area Clip 50 (FIG. 5)

This procedure controls the whole of the area clipping process. The 'subject area' is clipped to the 'clip area'. The result is a new subject area that defines all those parts of the original subject area that are outside of the clip area.

Call 'BUILD PARTS LIST' to build the subject parts list which contains all parts of the 'subject area' that are outside the 'clip area'.

Call 'BUILD PARTS LIST' to build the clip parts list which contains all parts of the 'clip area' that are inside the 'clip area'. This list will also contain 'overlapping clip parts'.

Scan both parts list and move any parts that are polygons to the result area.

```
SCAN:
DO for each subject part WHILE subject parts list is not empty
IF there is a non-overlapping clip part that will join THEN
CALL 'JOIN TWO PARTS'
ITERATE the SCAN loop
ENDIF
IF there is a subject part that will join THEN
CALL 'JOIN TWO PARTS'
ITERATE the SCAN loop
ENDIF
IF there is an overlapping clip part that will join THEN
CALL 'JOIN TWO PARTS'
ITERATE the SCAN loop
ENDIF
If this point is reached, we took a wrong turning further back
which has lead us to a dead end.
Scan the subject area definition and shift it by one unit RESTART
the clipping procedure.
ENDDO
The subject list is now empty, try to construct more polygons from
any remaining clip parts.
SCAN2:
DO WHILE clip parts list is not empty
Take the 1st clip part
DO for each subsequent clip part
IF it will join to the first clip part THEN
CALL 'JOIN TWO PARTS'
ITERATE the SCAN2 loop
ENDIF
ENDDO
Delete the 1st clip part, it does not form a polygon
ENDDO
Clipping is now complete
Delete the original subject area and replace with the result area.
```

Build Parts List (51)

This procedure is passed two area definitions, the subject area is to be divided into parts that are either inside or outside of the clip area. Note that the terms 'subject area' & 'clip area' are with respect to the processing done by this procedure, and are independent of the same terms used in the AREA CLIP procedure.

```
DO for each polygon in the subject area definition
DO for each vertex in the polygon
Consider the line from the current vertex to the next
vertex CALL 'WINDOW' to test if we can trivially reject
the line
IF line can be rejected THEN
IF parts are to be outside the clip area THEN
Result = current line
ELSE
Result = null
ELSE
CALL 'CLIP LINE TO AREA' to clip the line
ENDIF
DO for each line in the result
If this line is not flagged as overlapping THEN
CALL 'ADD LINE TO PARTS LIST'
ELSE
only process overlapping lines when building a
list of parts that are inside the clip area
```

-continued
```
IF parts are to be inside the clip area THEN
each overlapping line is further clipped to its
containing area to split it up if it is intersected by
its own boundary.
CALL 'CLIP LINE TO AREA' to produce the split
result
DO for each line in the split result
CALL 'ADD LINE TO PARTS LIST'
Delete the line from the split result
ENDDO
ENDIF
ENDIF
ENDDO
Delete the line from the result
ENDDO
ENDDO
If the first vertex in the first part is the same as the
last vertex in the last part
AND neither of the parts is flagged as overlapping
THEN
CALL 'JOIN TWO PARTS' to join the first part to the last
part
ENDIF
```

Add Line To Parts List 52

Add a single line to a parts list. Lines flagged as overlapping are held individually in the parts list. Other lines will be appended to the end of the current part if that is possible.

```
IF parts list is empty
OR current part is flagged as overlapping
OR line is flagged as overlapping
OR last vertex of current part is different from first
vertex on line
THEN
Start a new part
Copy the first and last vertex of the line into the new
part
ELSE
Add the last vertex of the line to the current part
ENDIF
```

Window 53

This procedure takes a line and an area, and sets a flag to indicate whether the line is completely outside the incidence rectangle of the area. This enables the line to be trivially rejected from clipping.

A suitable technique can be found in (3) expand reference (3)

Join Two Parts 54

This procedure takes two parts (part1 and part2) and joins them together. It is assumed that the caller has determined that the last vertex in part1 is the same as one of the end vertices of part2, i.e. that part2 can be joined to the end of part1.

Part2 is removed from its containing list and appended to part1, if part1 now defines a polygon, it is removed from its list and added to the Result area definition.

```
IF last vertex of part1 = last vertex of part2 THEN
reverse the order of the vertices in part2
ENDIF
Delete the last vertex in part1
Move part2 onto the end pf part1
IF the last vertex is the same as the first vertex in part1
THEN
A polygon has been formed
```

```
Remove part1 from its list
IF all lines in the polygon are flagged as overlapping
THEN
  This polygon is common to both areas, we must
  determine its sense
  Define a horizontal line that bisects the incidence
  retangle of the polygon, i.e. xmin, (ymax−ymin)/2 to
  xmin, (ymax−ymin)/2
  CALL 'CLIP LINE TO AREA' to clip line inside of
  subject area
  CALL 'CLIP LINE TO AREA' to clip line inside of clip
  area compare these two results
  IF 1st point in each result is different
  OR only one of the results is null
  THEN
    Polygons have different sense (i.e. one is a hole
    and the other is a solid)
    Move polygon to the result area definition
  ELSE
    Delete polygon
  ELSE
    Move polygon to the result area definition
  ENDIF
ENDIF
```

Clip Line To Area 55

This procedure clips a single 'subject line' to the inside or the outside of an area. The result is a number of lines, represented by a list containing an even number of ordered points. Each odd-even pair of points define the two end points of a line.

Determine the major axis of the line

```
IF end point 1 > end point 2 along the major axis THEN
  swap the lines two end points over
  remember that the line has been reversed
ENDIF
```

CALL 'GET INTERSECTION LIST' to build a list of all intersections that the line (extended to infinity in both directions) makes with the area.
CALL 'PROCESS INTERSECTION LIST' to build the list of vertices representing the clipped line
IF the original line was reversed THEN swap the lines two end points over

Get Intersection List 56

Find all intersections of a line extended to infinity with an area boundary.

The intersection of the subject line with each boundary line is calculated, if the intersection is within the extent of the boundary line, it is added to the intersection list.

Boundary lines that are colinear to the subject line are added to a list of colinear boundary lines, this list is used by 'IDENTIFY OVERLAPPING LINES' to flag any parts of the clipped line that overlap a boundary line.

Once sorted, the intersection list defines each point where the extended subject line enters and leaves the area, thus when scanning through the list, lines from odd to even numbered intersections are within the area, and lines from even to odd numbered intersection are outside the area.

It is important to ensure that the correct number of intersections is added to the list, when the subject line intersects a vertex or is colinear to a boundary line, see FIG. 4. This is handled by the routines 'PROCESS PARALLEL LINE' and 'ADD AN INTERSECTION'.

```
DO for each polygon in the area
DO for each vertex in the polygon
  Consider the boundary line p1-p2 from the current
  vertex to the next vertex
  IF boundary line is parallel to the subject line THEN
    CALL 'PROCESS PARALLEL LINE'
  ELSE
    IF intersection is within extent of the boundary
    line THEN
      CALL 'ADD AN INTERSECTION'
    ENDIF
  ENDIF
ENDDO
ENDDO
```

Process Intersection List 57

The intersection list is sorted and scanned to determine which intersections are required to make up the resultant clipped line definition. Intersections outside the extent of the subject line are removed.

Sort the intersection list along the major axis.
Delete and count the intersections that are before or at the first end point of the subject line.
If the count is odd, the 1st end point of the subject line is inside the area, otherwise it is outside.
Add the 1st end point of the subject line to the start of the intersection list according to the following table:

| Lines 1st end point | Type of clipping | Add 1st point to list |
|---|---|---|
| inside area | inside | yes |
| inside area | outside | no |
| outside area | inside | no |
| outside area | outside | yes |

Scan and count the intersection list to find the last intersection that is before the subject lines 2nd end point.

```
IF the count is odd THEN
  Add the subject lines 2nd end point to the end of the
  intersection list
ENDIF
```

Delete any remaining intersections after the 2nd end point.

```
IF the subject line was reversed by 'GET INTERSECTION
LIST' THEN reverse the order of the intersections.
ENDIF
```

The intersection list now defines the clipped subject line
CALL 'IDENTIFY OVERLAPPING LINES' to flag any portions of the result that overlap an area boundary line

Identify Overlapping Lines 58

Lines and gaps in the resultant clip line definition are compared with the boundary lines in the colinear boundary lines list. Any lines that overlap with a boundary line are flagged as overlapping. Also any gaps that overlap with a boundary line are added to the clipped line definition as overlapping lines.

```
DO for each odd numbered point in the clipped line
```

```
-continued
definition
IF line from current point to next point overlaps
one of the boundary lines in the colinear boundary lines
list
THEN
flag this line as overlapping
ENDIF
IF line from next point to the next point after overlaps
THEN
Add these two points after the current point to make
the gap into a line
flag this new line as overlapping
END
ENDDO
IF the 1st end point of the subject line is not in the
clipped result THEN
IF line from 1st end point of the subject line to 1st
point in the clipped line is overlapping
THEN
Add these two points after the current point to make
the gap into a line
flag this new line as overlapping
ENDIF
ENDIF
If the 2nd end point of the subject line is not in the
clipped result THEN
IF line from the last point in the clipped result to the
2nd end point of the subject line is overlapping
THEN
Add these two points after the current point to make
the gap into a line
flag this new line as overlapping
ENDIF
ENDIF
```

Add An Intersection 59

This procedure determines whether to add none, one or two intersections to the intersection list. If the intersection occurs at P1, it is not necessary to add it, because that particular intersection will have been processed as P2 for the previous line. If the line intersects at P2, we must determine if the subject line is tangential to the area, if it is, two intersections at P2 are added, otherwise one intersection at P2 is added. If the intersection is not at P1 or P2, the actual intersection is calculated and added to the intersection list.

```
IF intersection is at P1 THEN
do nothing
ELSE
IF intersection is at P2 THEN
Consider line from P1 to P3 (the next vertex after
P2)
IF subject line intersects line P1-P3 within the
extent of P1-P3
THEN
The subject line is not tangential to the area
Add point P2 to the intersection list twice
ENDIF
ELSE
Calculate the coordinates of the intersection
Add the intersection point to the intersection list
ENDIF
ENDIF
```

Process Parallel Line 60

This procedure processes a subject line that is parallel to the current boundary line P1-P2. If the two lines are not colinear, no intersections are added. If they are colinear, similar processing to that in 'ADD AN INTERSECTION' is done to determine if the subject line is tangential to the area or not.

Determine the minor axis of boundary line P1-P2
Rotate the line by adding 1 to P1 and subtracting 1 from P2 along the minor axis. IF the subject line intersects the rotated boundary line at the centre

```
THEN
The lines are colinear
Consider the line from P0 (previous vertext to P1) and
P3
(next vertex after P2)
IF subject line intersects line P0-P3 within the
of P0-P3
THEN
The subject line is not tangential to the area
Add point P2 to the intersection list
ELSE
The subject line is tangential to the area
Add point P2 to the intersection list twice
ENDIF
ENDIF
```

Implementation Notes

Line intersection calculation

The following technique is used to calculate the intersection of two lines. Fixed point arithmetic can be used throughout, thus avoiding rounding errors. Also the position of the intersection, relative to either of the lines can found by comparing the top and bottom of the fraction forming At or Bt without having to calculate the actual intersection.

Assume two lines A and B defined by their end points Ax1,Ay1 Ax2,Ay2 and Bx1,By1 and Bx2,By2

```
Aa = Ay1−Ay2   Ba = By1−By2
Ab = Ax2−Ax1   Bb = Bx2−Bx1
bot = (Ab*Ba) − (Aa*Bb)
if bot=0, the two lines are parallel
Atop = Bb*(By1−Ay1) + Ab (By1−Ay1)
At = Atop / bot
If 0<=At<=1 then intersection is within the extent of line A
If At<0 int. is on the side of point Ax1,Ay1
If At>1 int. is on the side of point Ax2,Ay2
Btop = Aa*(Bx1−Ax1)
Bt = Btop / bot
If 0<=Bt<=1 then intersection is within the extent of line B
If Bt<0 int. is on the side of point Bx1,By1
If Bt>1 int. is on the side of point Bx2,By2
```

The intersection point Ix,Iy can be calculated using Bt or At $$Ix = Ab*At + Ax1 = Bb*Bt + Bx1$$

$$Iy = -Aa*At + Ay1 = -Ba*Bt + By1$$

Data structures

Area definitions, are represented by a simple data structure consisting of a list of polygons, each polygon is represented as a ring of points (vertices).

```
        Area Definition
          pap area attributes
        pap - polygon anchor pointer
           List of polygons
             nxtp prvp
        |  A   nxtp - next pointer
        V  |   prvp - previous pointer
              ....
              | A
        V  | POLYGON DEFINITION
```

```
            -continued
         vap poly. attributes
         vap - vertex anchor pointer
         V  V ring of points
               nxtp prvp
                  A
                  |
                  V
                 ....
                  A
                  |
                  V
           POINT DEFINITION
             point attributes
                  A
```

Area attributes will include all information pertaining to the area, e.g.

The areas incidence rectangle (min & max X & Y values)
Colour
Shading pattern
 Polygon attributes may include:
 The polygons incidence rectangle
 Vertex count.

Point attributes include the co-ordinate of the point, and attributes pertaining to the line from this point to the next point.
e.g.:
X co-ordinate
Y co-ordinate
colour
linetype
overlapping flag.

A line definition is simply two or more point definitions chained together, thus a single boundary line is passed to the clipping routine simply by passing the current polygon vertex. The result of the clipping is a list of point definitions, lines exist between each odd numbered point and its next point, gaps exist between each even numbered point and its next point.

Figure 6:
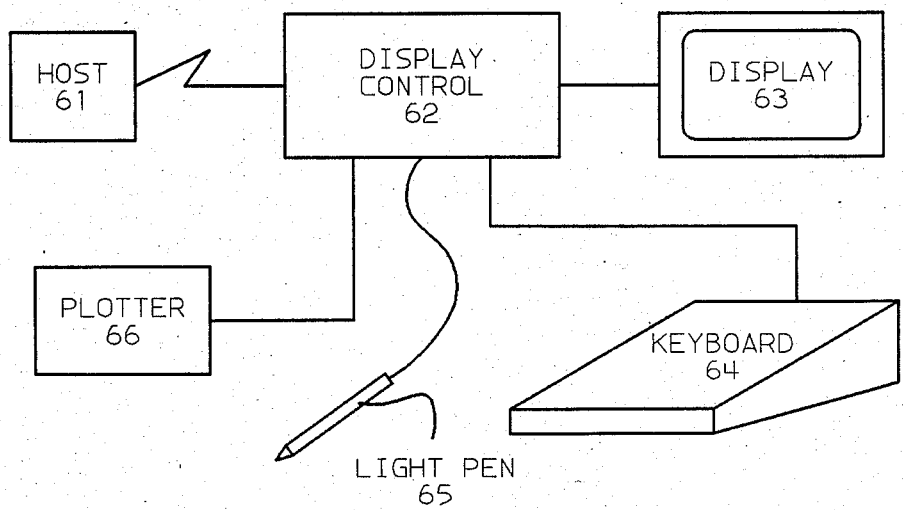
FIG. 6 is a block schematic of a system in which the method can be implemented.

The method described above may be implemented on a system such as is illustrated schematically in FIG. 6. A host central processing unit 61 has a connection to a display control unit 62. The display control unit 62 controls the display and display screen 63 and receives input signals from a Keyboard 64 and an cursor control device 65 which may be a light pen, a tablet or an optical mouse. Hardcopy of the display pictures is provided by a plotter 66 also controlled by the display control unit. A graphic picture may be developed by a user interactively on the display screen and stored for later use in the host central processing unit. Alternatively a hardcopy may be produced by the plotter 66, it is then that the process described above is used.

The control mechanism for controlling the operation of the system to perform the process may be a control routine stored in the central process unit or may be a control routine store on a diskette and loaded into the random access store of the display control unit. A further embodiment includes a programmable read only memory which is included in the display control unit and storing the routines to perform the process.

All such possible mechanisms are contemplated to fall within the scope of the following claims.

What is claimed is:

1. A method of determining the coincidence of a subject area and a clip area, in a graphic display system in which area definitions are stored in a display list store comprising the steps of:
 (a) creating and storing a subject area parts list comprising separate entries for each part of one or more contiguous lines of the subject area that do not pass through the clip area
 (b) creating and storing a clip area parts list comprising separate entries for each part of one or more contiguous lines of the clip area that pass through the subject area
 (c) creating and storing an overlap parts list comprising separate entries for each part of one line of the subject and clip areas that overlap
 (d) for each entry in the subject area parts list scanning unprocessed entries first in the subject area parts list secondly in the clip area parts list thirdly in the overlap parts list for any entry having an end point definition the same as on end point definition of the part being processed, creating a new part by joining any part found to the part being processed storing the created part in a results part list and reiterating the process for the entry in the results part list until no further parts are found whereby the results part list includes the definition of the portion of the subject area which does not coincide with the clip area.

2. A method as claimed in claim 1 in which the graphic display system includes an output pen plotter and the result parts list is used to control the plotter when the subject area is drawn.

3. A graphic display system, in which complex area definitions are stored in a display list buffer, including control means adapted to control the operation of the system to perform the method of determining the coincidence of a subject area and a clip area comprising the steps of:
 (a) creating and storing a subject area parts list comprising separate entries for each part of one or more contiguous lines of the subject area that do not pass through the clip area
 (b) creating and storing a clip area parts list comprising separate entries for each part of one or more contiguous lines of the clip area that pass through the subject area
 (c) creating and storing an overlap parts list comprising separate entries for each part of one line of the subject and clip areas that overlap
 (d) for each entry in the subject area parts list scanning unprocessed entries first in the subject area parts list secondly in the clip area parts list thirdly in the overlap parts list for any entry having an end point definition the same as on end point definition of the part being processed, creating a new part by joining any part found to the part being processed storing the created part in a results part list and reiterating the process for the entry in the results part list until no further parts are found whereby the results part list includes the definition of the portion of the subject area which does not coincide with the clip area.

4. A graphic display system as claimed in claim 3 including an output pen plotter and in which the results part list is used to control the plotter when the subject area is drawn.

5. In a graphic display system a process for determining the coincidence of complex areas comprising for each subject area and clip area the steps of:

(a) creating and storing a subject area parts list comprising separate entries for each part of one or more contiguous lines of the subject area that do not pass through the clip area (b) creating and storing a clip area parts list comprising separate entries for each part of one or more contiguous lines of the clip area that pass through the subject area (c) creating and storing an overlap parts list comprising separate entries for each part of one line of the subject and clip areas that overlap (d) for each entry in the subject area parts list scanning unprocessed entries first in the subject area parts list secondly in the clip area parts list thirdly in the overlap parts list for an entry having an end point definition the same as on end point definition of the part being processed, creating a new part by joining any part found to the part being processed storing the created part in a results part list and reiterating the process for the entry in the results part list until no further parts are found whereby the results part list includes the definition of the portion of the subject area which does not coincide with the clip area.

6. A system as claimed in claim 5 including an output pen plotter and in which the results parts list is used to control the plotter when the subject area is drawn.

* * * * *